United States Patent
Yokota et al.

(10) Patent No.: US 7,239,609 B2
(45) Date of Patent: Jul. 3, 2007

(54) CONGESTION CONTROL SYSTEM AND METHOD FOR WEB SERVICE

(75) Inventors: Daisuke Yokota, Yokohama (JP); Fumio Noda, Kodaira (JP); Yasuhiro Takahashi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 941 days.

(21) Appl. No.: 10/190,584

(22) Filed: Jul. 9, 2002

(65) Prior Publication Data

US 2003/0099197 A1 May 29, 2003

(30) Foreign Application Priority Data

Nov. 28, 2001 (JP) ............................. 2001-361911

(51) Int. Cl.
*H04L 1/00* (2006.01)
(52) U.S. Cl. ...................... 370/230; 370/236; 709/232
(58) Field of Classification Search ...................... None
See application file for complete search history.

(56) References Cited

U.S. PATENT DOCUMENTS

| | | | | |
|---|---|---|---|---|
| 6,088,737 A * | 7/2000 | Yano et al. | ................. | 709/235 |
| 6,643,581 B2 * | 11/2003 | Ooishi | ........................ | 701/207 |
| 6,671,259 B1 * | 12/2003 | He et al. | .................... | 370/238 |
| 6,766,422 B2 * | 7/2004 | Beyda | ........................ | 711/137 |
| 2001/0005360 A1 * | 6/2001 | Lee et al. | ................... | 370/236 |
| 2001/0034790 A1 * | 10/2001 | Sato et al. | .................. | 709/235 |
| 2003/0026207 A1 * | 2/2003 | Loguinov | ................... | 370/235 |
| 2003/0048751 A1 * | 3/2003 | Han et al. | ................... | 370/231 |
| 2003/0055882 A1 * | 3/2003 | Kawamura | .................. | 709/203 |
| 2006/0085514 A1 * | 4/2006 | Deen et al. | ................. | 709/206 |

FOREIGN PATENT DOCUMENTS

| | | |
|---|---|---|
| JP | 09-200208 A | 1/1996 |
| JP | 09008907 | 1/1997 |
| JP | 9153013 | 6/1997 |
| JP | 2001/67314 | 3/2001 |

* cited by examiner

*Primary Examiner*—Andrew C. Lee
(74) *Attorney, Agent, or Firm*—Mattingly, Stanger, Malur & Brundidge, P.C.

(57) ABSTRACT

A congestion control system provided in a connection portion between a network for an Internet provider and the Internet estimates a processing capability of a Web server on the basis of states of TCP/IP such as a window size of connection being connected, a cancellation rate of packet, a response time, a throughput and the like in a congestion state of the Web server to be requested and a network to the Web server and calculates a regulation duration for each Web server on the basis of the processing capability and the number of clients being in a waiting state for a re-request to the Web server so that the client is regulated when a response for regulating the re-request with the regulation duration is returned to the client. Consequently, since the number of re-requests per unit time can be made fixed, congestion due to re-requests can be prevented and the user can necessarily utilize the Web server upon re-request. Further, the service utilizable hour can be grasped to utilize the Web service deliberately.

13 Claims, 14 Drawing Sheets

FIG. 6

| IDENTIFICATION 130 | REQUEST URL 131 | MAX CONNECTION 132 | CURRENT CONNECTION 133 | TIME 134 | | TIME | | |
|---|---|---|---|---|---|---|---|---|
| | | | | THROUGHPUT | ... | THROUGHPUT | ... | |
| 1 | www.host_a.com | 2000 | 500 | 200 | ... | 200 | ... | ... |
| 2 | www.host_b.com | 1500 | 500 | 400 | ... | 400 | ... | ... |
| ... | ... | ... | ... | ... | | ... | | |

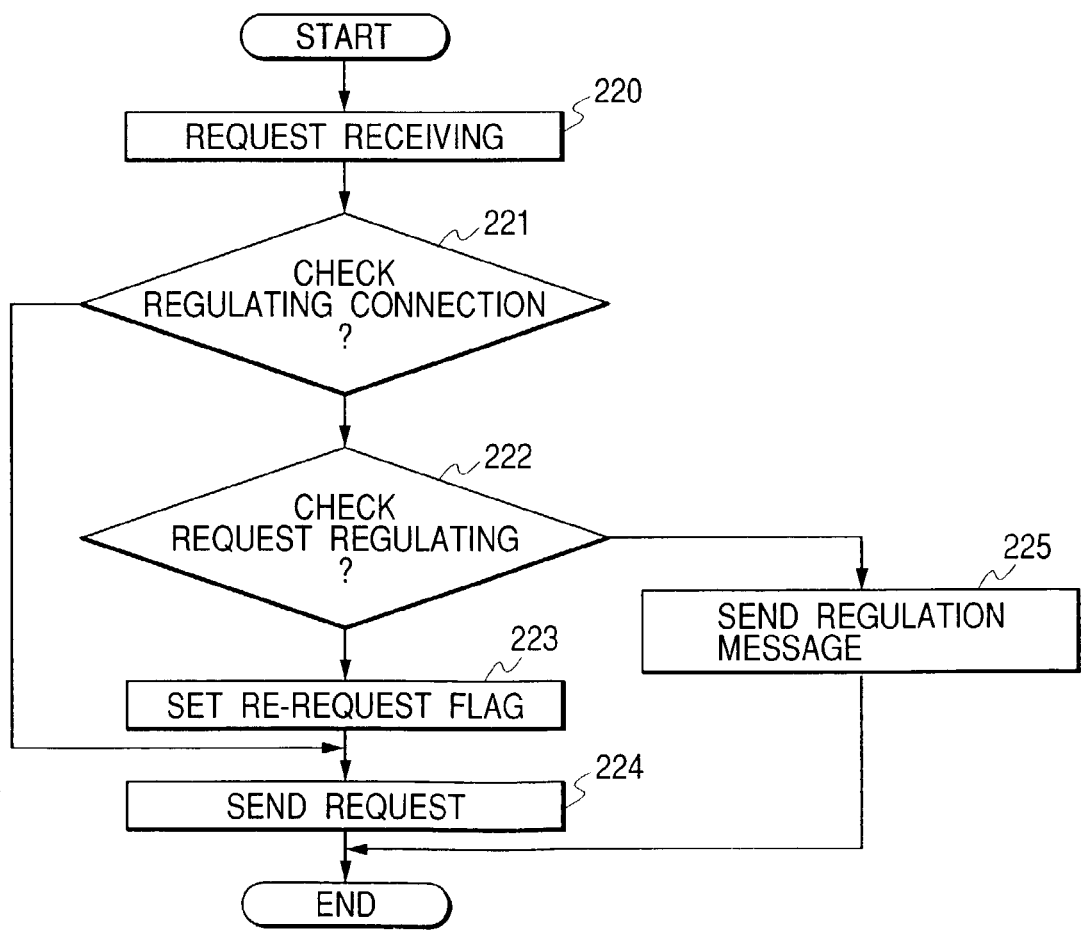

| LOCATION | MAX CONNECTION | CURRENT CONNECTION | THROUGHPUT |
|---|---|---|---|
| LOCATION A | 2000 | 500 | 200 |
| LOCATION B | 1500 | 10 | 400 |
| ⋮ | ⋮ | ⋮ | ⋮ |

CONGESTION CONTROL SYSTEM AND METHOD FOR WEB SERVICE

BACKGROUND OF THE INVENTION

The present invention relates to a congestion control system of a network and more particularly to a congestion control system in services and applications utilizing the Web.

In the Web service, Web clients of users and Web servers for providing services are connected through a network constructed by a plurality of relay apparatuses to provide the services to the Web clients. When requests are concentrated at the Web servers or the relay apparatuses constructing the network to the extent of exceeding the processing performance thereof, the quality of the whole Web service is degraded even if it is partial congestion.

The Web can be utilized by means of a portable telephone, a portable terminal or the like without temporal and geographical restriction and it is considered that utilization of the Web service is concentrated on specific contents, Web server, time and utilization place in response to a specific time or occurrence of any event.

There is congestion control technique in order to prevent network resources such as processing performance and the like of the Web servers and the relay apparatuses from being exhausted due to the concentration of utilization. The congestion control technique in the Web service is mainly classified into two systems as follows:

A first system is a system in which when requests exceeding an amount of utilizable resources are issued, the requests are cancelled. In this system, control means is provided in a network resource or between the network resource and the clients to relay requests from the clients usually. The control means grasps or monitors an amount of resource to be controlled and an amount of utilization thereof and when the utilization amount exceeds the resource amount or a previously defined value, the control means does not relay requests and cancels the requests.

A second system is a system in which when requests exceeding an amount of utilizable resources are issued, a command is transmitted to the clients issuing the requests to prevent the clients from utilizing the same resource for a fixed time so as to perform connection request regulation. The second system has the same network structure and the congestion judgment method as those of the first system and is different therefrom in that a response for instructing the connection request regulation is returned to the clients instead of cancellation of the requests. The clients which have received the connection request regulation perform the instructed regulation.

SUMMARY OF THE INVENTION

In the Web service provided by Internet providers, management of quality and prevention of degradation of service due to concentration of requests are required.

In the Web service, communication between the client and the Web server is named connection and the number of connections which the relay apparatuses constructing the network can be processed is one of important resources. When congestion occurs in part of the network, connections are held for a long time and accordingly the number of connections in the while network is increased to thereby press other resources.

Accordingly, in the first system, congestion of only partial network resources such as specific Web servers and relay apparatuses is merely controlled and congestion in the whole network cannot be controlled to thereby degrade the quality of the whole Web service.

Further, since the users of the Web service cannot understand the reason of cancellation of request when the request is canceled and a response is not returned, the users often issue a request at once again. Consequently, the number of requests is increased and accordingly the first system has low effectivity as the congestion control system of the Web service.

In the second system, since a congestion control system notifies the users of a regulation duration for regulating occurrence of congestion and re-requests by the user, increase of requests due to the re-requests by the user can be prevented only for the regulation duration. However, since the regulation duration is a fixed time, the requests causing the congestion are apt to be issued simply after the regulation duration again, so that similar congestion is produced again. The resumption time for utilization of the Web service cannot be understood to the users and the Web service is difficult to utilize. Moreover, since the degree of concentration of requests and the processing performance of the Web servers are different in each of the Web servers, congestion control cannot be performed effectively if the regulation duration is fixed. Accordingly, it is necessary to control the number of re-requests to be fixed so that the number does not exceed the processing capability and prevent congestion due to the re-requests.

The users cannot utilize the service because of congestion even if re-request is issued after the expiration of the regulation duration and cannot understand when the service can be utilized.

Further, when the characteristics of the Web service are considered, requests are different for each of the Web servers and the users. For example, importance of the Web service is different depending on the users and a specific user has a need that he desires to utilize the service preferentially.

As another problem, an operator of the congestion control system is required to designate parameters such as the number of connections for starting the congestion control and the regulation duration in order that the existing congestion control system performs the congestion control. However, in order to establish these parameters, it is necessary to perform design and verification of the parameters, tuning and the like and there is a problem that the parameter design is difficult and an operation cost is increased.

The congestion control system of the present invention is provided on the route between the Web clients and the Web servers in the Web service and comprises means for identifying a Web server or URL to be requested described in the request when a request from the Web client is relayed to the Web server and transmitting to the Web client as a response a connection regulation duration controlled on the basis of the number of clients to which a connection request regulation message to the Web server is transmitted as a response and the estimated processing capability of the Web server when requests exceeding the estimated processing capability of the Web server are relayed to the Web server.

Further, the congestion control system comprises means for automatically adjusting the request processing capability of the Web server utilized in the request regulation to the Web server in accordance with a delayed state of a response packet from the Web server.

In addition, the congestion control system comprises means for causing the Web client to transmit positional information of the Web client and totalizing requests concentrated in each area on the basis of the positional information to thereby make connection request regulation to the Web client in each area.

Further, according to another aspect of the present invention, in a relay method for relaying a contents receiving request from the Web client and a response of contents from a Web server corresponding to the contents receiving request, when it is detected that a relay state at the time of the relaying is in a previously set congestion state, a connection request regulation message for regulating the Web client from transmitting the content receiving request to the Web server for a predetermined connection regulation duration is transmitted to the Web client as a response instead of contents and the connection regulation duration is not a fixed value.

The connection regulation duration can be varied on the basis of the congestion state of the Web server, information concerning the processing capability of the Web server or information concerning the number of current contents receiving requests. Further, the connection regulation duration can be also varied in accordance with the Web client. In addition, the connection regulation duration can be also varied in accordance with the congestion state of the network between the Web servers and the Web clients.

Other objects, features and advantages of the invention will become apparent from the following description of the embodiments of the invention taken in conjunction with the accompanying drawings.

BRIEF DESCRIPTION OF THE DRAWINGS

FIG. 6 shows a Web server state management table;

FIG. 7 shows a regulation information management table.

FIG. 8 is a flow chart showing operation of a Web request transmission unit;

DESCRIPTION OF THE EMBODIMENTS

Embodiments according to the present invention will be described with reference to the accompanying drawings.

Embodiment 1

A first embodiment according to the present invention is now described with reference to the drawings.

(1) Outline of System

Figure 1:
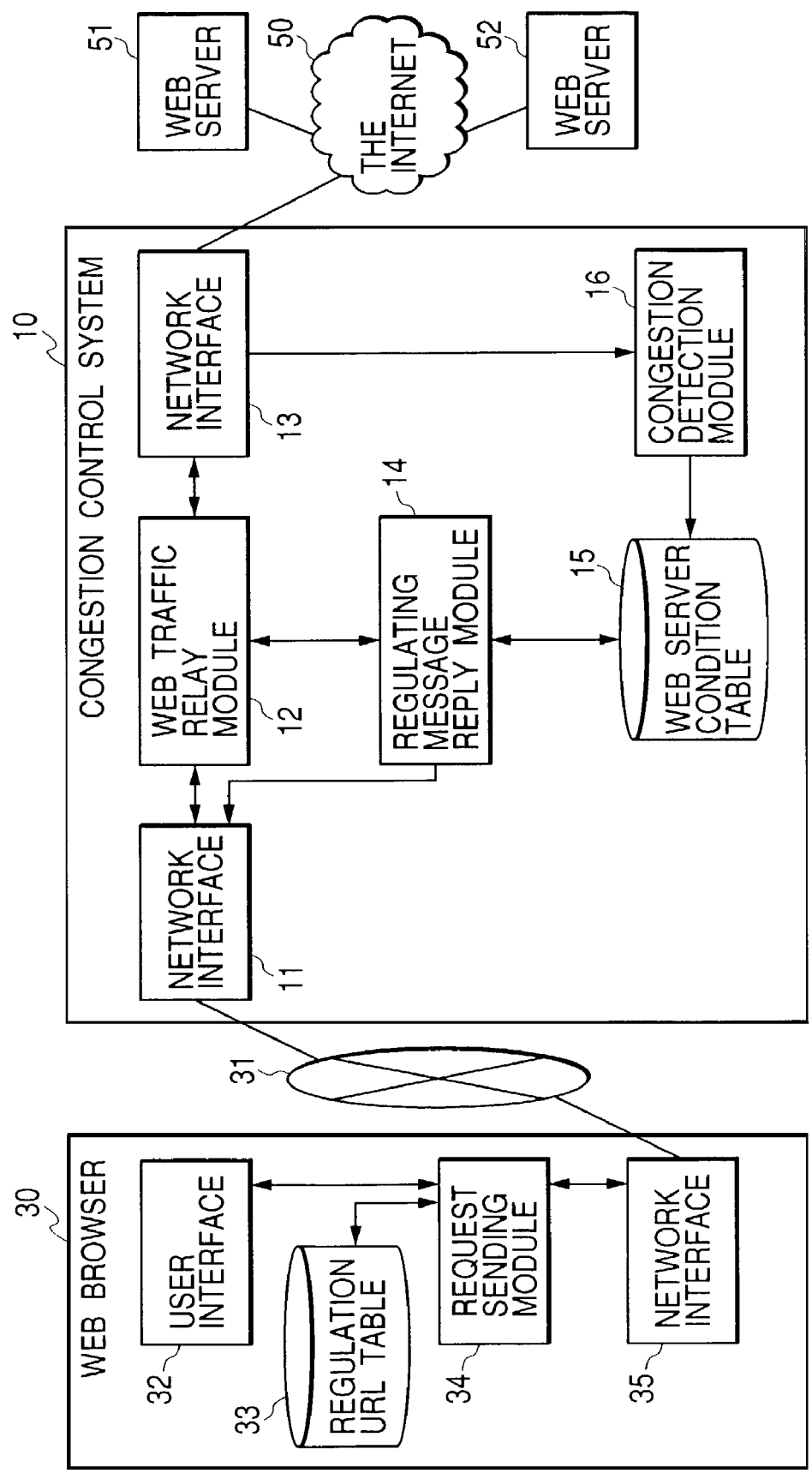
FIG. 1 is a block diagram schematically illustrating a congestion control system.

Referring first to FIG. 1, an outline of a congestion control system according to the first embodiment is described.

FIG. 1 is a schematic diagram illustrating the congestion control system.

A congestion control apparatus 10 instructs a Web browser 30 to regulate a connection request for a regulation duration controlled in accordance with a congestion state of a Web server 51 when the Web browser 30 makes an access request to the Web server 51 being in the congestion state.

The Web browser 30 receives a request from a user by means of a user interface 32 and causes a Web request transmission unit 34 to transmit a connection request to the Web server 51 through a network interface 35. The connection request is transmitted through a network 31 and the congestion control apparatus 10 to the Web server 51.

The congestion control apparatus 10 receives the connection request from the Web browser 30 by means of a network interface 11 and relays the request by a Web traffic relay unit to be transmitted through a network interface 13 to the Web server 51. At this time, when the congestion control apparatus detects that the Web server 51 is in the congestion state, a connection regulation response unit 14 transmits as a response a connection request regulation message for regulating connection for a predetermined regulation duration to the Web browser 30 through the network interface 11 in response to the connection request from the Web browser 30.

At this time, the connection regulation response unit 14 records for each Web server the number of connection regulations corresponding to the connection request regulation messages transmitted, in a Web server state table 15. The connection regulation response unit 14 calculates the regulation duration on the basis of a value of an estimated processing capability or throughput 134 of the Web server 51 divided by the number of connection regulations recorded in the Web server state table 15 for each Web server.

The Web server state table 15 manages the number of connection regulations and the estimated processing capability or throughput for each Web server.

The congestion detection unit 16 obtains information as to whether communication between the congestion control apparatus 10 and the Web server 51 is delayed or not from the network interface 13 and detects whether the Web server 51 is in the congestion state or not to thereby estimate the current processing performance of the Web server 51.

When the Web server 51 is in the congestion state, the connection request regulation message is returned to the Web browser 30 from the congestion control apparatus 10. When the Web browser 30 receives the connection request regulation message by means of the network interface 35, the Web request transmission unit 34 records information of the Web server instructed with Web connection regulation and the connection regulation duration in a regulation information table 33. The Web request transmission unit 34 compares the connection request from the user interface 32 with the information of the regulation information table 33 and when the connection request is a request to the regulated Web server and is within the regulation duration, notice to that effect is given to the user interface 32 to regulate the request.

The congestion control apparatus 10 performs the above processing for each Web server. Accordingly, when the Web browser 30 requires to connect to the Web server 52 different from the Web server 51, the congestion control apparatus 10 performs the same processing as above independently of the Web server 51.

(2) Configuration of System

The details of the system are now described with reference to the drawings.

FIG. 1 is a functional block diagram schematically illustrating the congestion control apparatus and related apparatuses thereto. The congestion connection apparatus 10 is connected through the network 31 to the Web browser 30 and through the Internet 50 to the Web servers 51 and 52.

The Web browser 30 includes input function for receiving a user's request, the user interface 32 having display function for displaying a response from the Web server, the regulation information table 33 for recording information concerning connection regulation instructed by the congestion control apparatus 10, the Web request transmission unit 34 for transmitting the connection request to the Web server, and the network interface 35 for transmitting the connection request to the network 31.

The congestion control apparatus 10 includes the network interface 11 for communicating with the network 31, the Web traffic relay unit 12 for interpreting received communication as Web traffic to relay it, the network interface 13 for communicating with the Internet 50, the connection regulation response unit 14 for transmitting the connection request regulation message as a response, the server state table 15 for recording the number of connection regulations for each Web server and the estimated processing capability or throughput of the Web server, and the congestion detection unit 16 for obtaining information from the network interface 13 to monitor whether a specific http connection is delayed or not.

Figure 2:
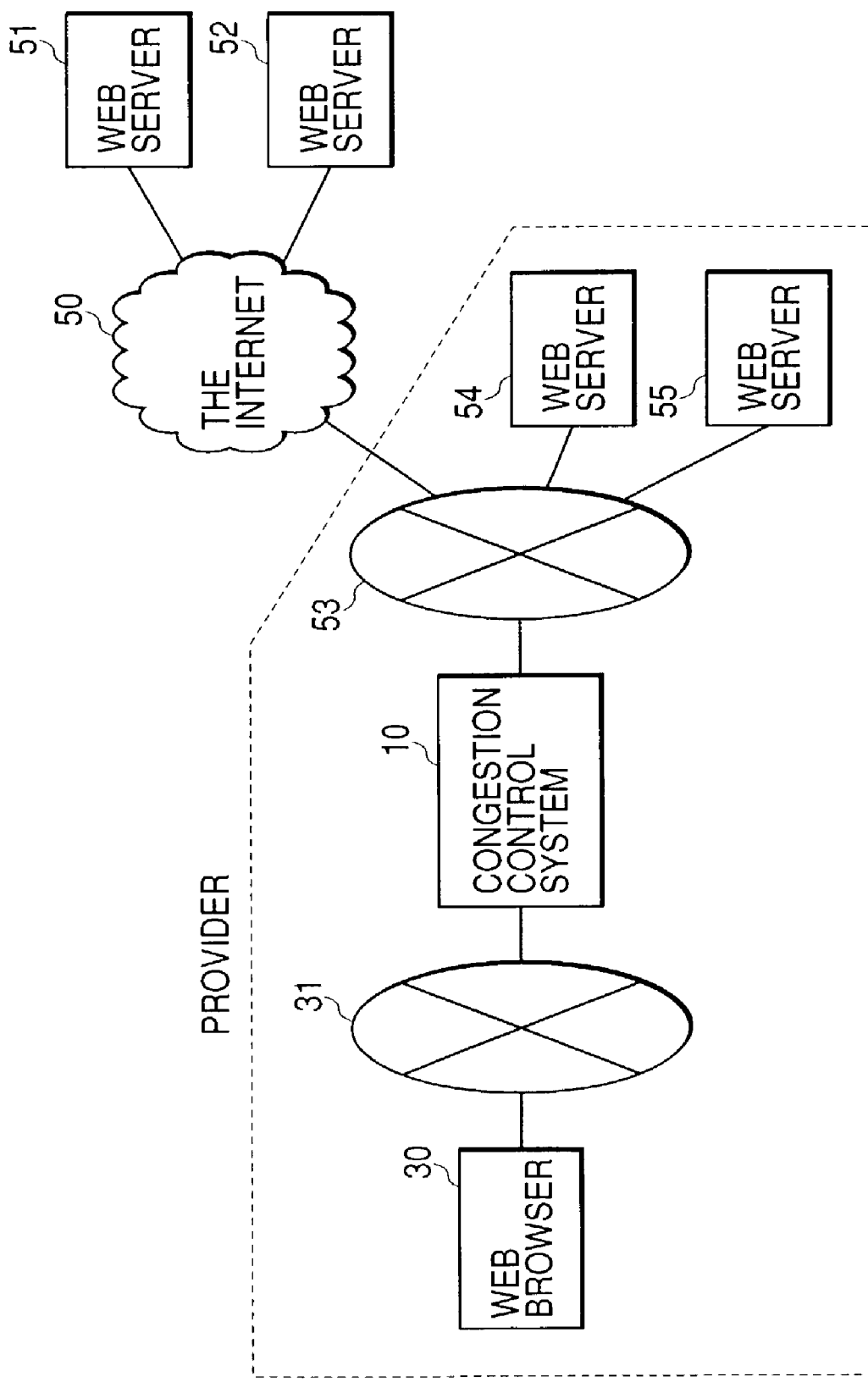
FIG. 2 is a schematic diagram illustrating network.

FIG. 2 is a diagram schematically illustrating the network supposed in the present invention. The congestion control apparatus 10 is connected to the Web browser 30 through the network 31. A plurality of Web browsers may be provided as far as the Web browsers are connected to the network 31. The congestion control apparatus 10 is connected to the Web server 51 through the network 53 and the Internet 50. When a plurality of Web servers are provided, the Web servers may be connected to the Internet 50 as the Web server 52 and may be connected to the network 53 as Web servers 54 and 55.

Figure 3:
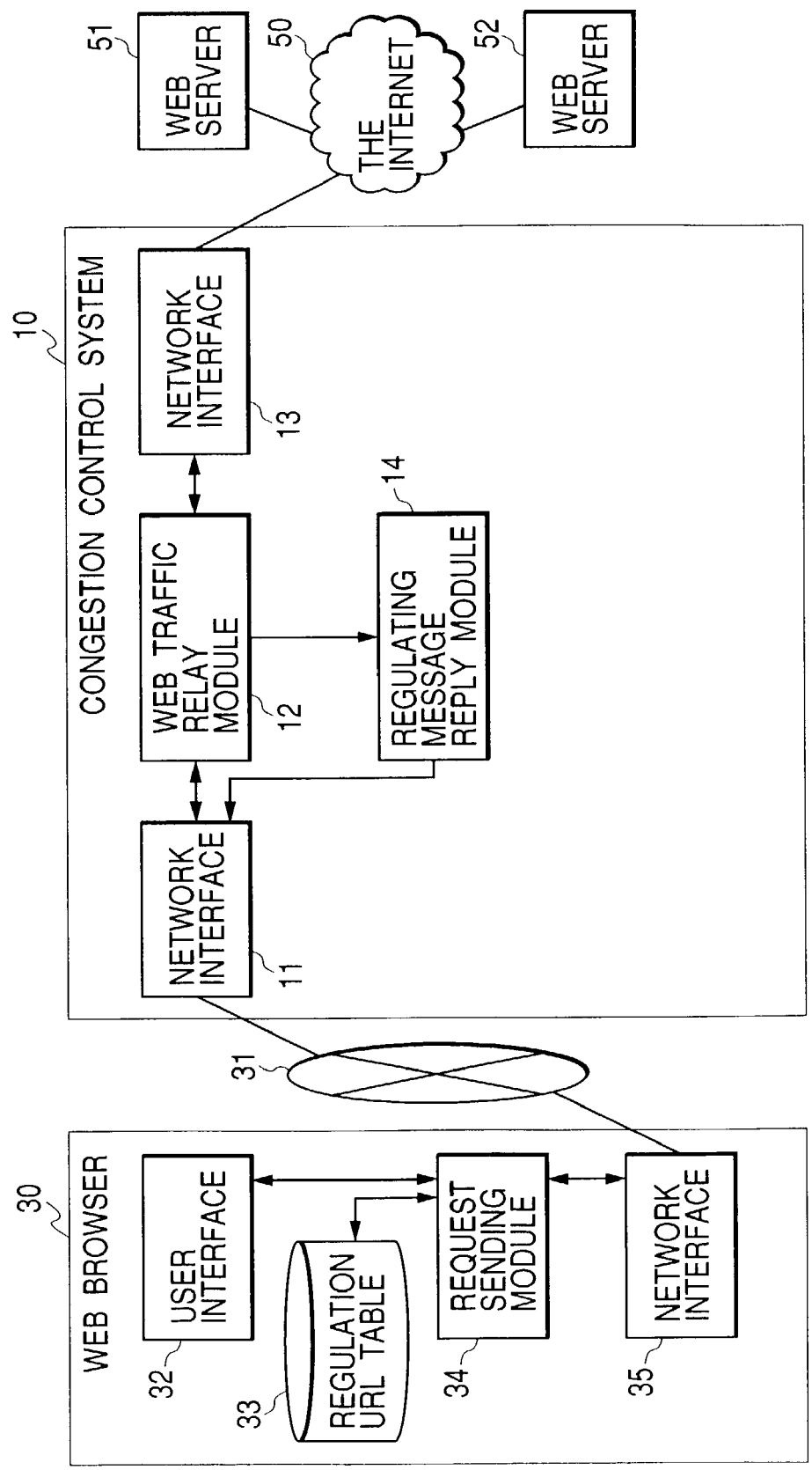
FIG. 3 is a block diagram schematically illustrating an existing congestion control system.

FIG. 3 is a functional block diagram schematically illustrating the congestion control apparatus and related apparatuses thereto shown for comparison with the configuration of FIG. 1. In the system of FIG. 3, the congestion control apparatus includes the network interface 11 for communicating with the network 31, the Web traffic relay unit 12 for interpreting received communication as Web traffic to relay it, the network interface 13 for communicating with the Internet 50, and the connection regulation response unit 14 for transmitting the connection request message as a response. The connection regulation duration transmitted to the Web browser 30 as a response is a fixed value regardless of the state of the Web server 51.

On the contrary, in the present invention, In order to control the connection regulation duration instructed by the connection request regulation message returned to the Web browser 30 in accordance with the state of the Web server 51, the server state table 15 and the congestion detection unit 16 are added newly as shown in FIG. 1. Consequently, in the configuration of FIG. 1, the connection regulation duration can be varied and particularly varied for each Web browser. Accordingly, congestion concentrated just after the expiration of the connection regulation duration again can be controlled as compared with the case where the connection regulation duration is fixed.

Figure 4:
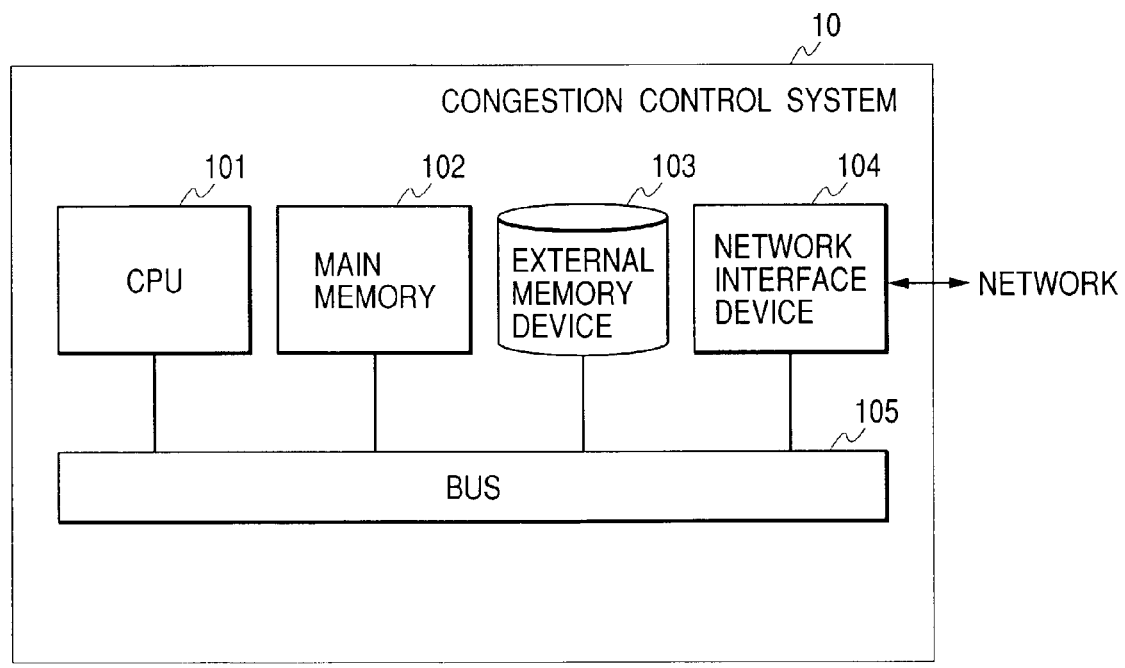
FIG. 4 is a block diagram illustrating the congestion control system constituted by software.

FIG. 4 is a block diagram schematically illustrating the congestion control apparatus 10.

The congestion control apparatus 10 includes a bus 105 for transmitting instructions and data, a central processing unit 101 for executing instructions, a main memory 102 for storing instructions and data during execution of instructions, an external storage unit 103 for storing programs of the Web traffic relay unit 12, the connection regulation response unit 14, regulation duration calculation unit 17 and the congestion detection unit 16 shown in FIG. 1 and the server state table 15, and the network interface 104.

Figure 5:
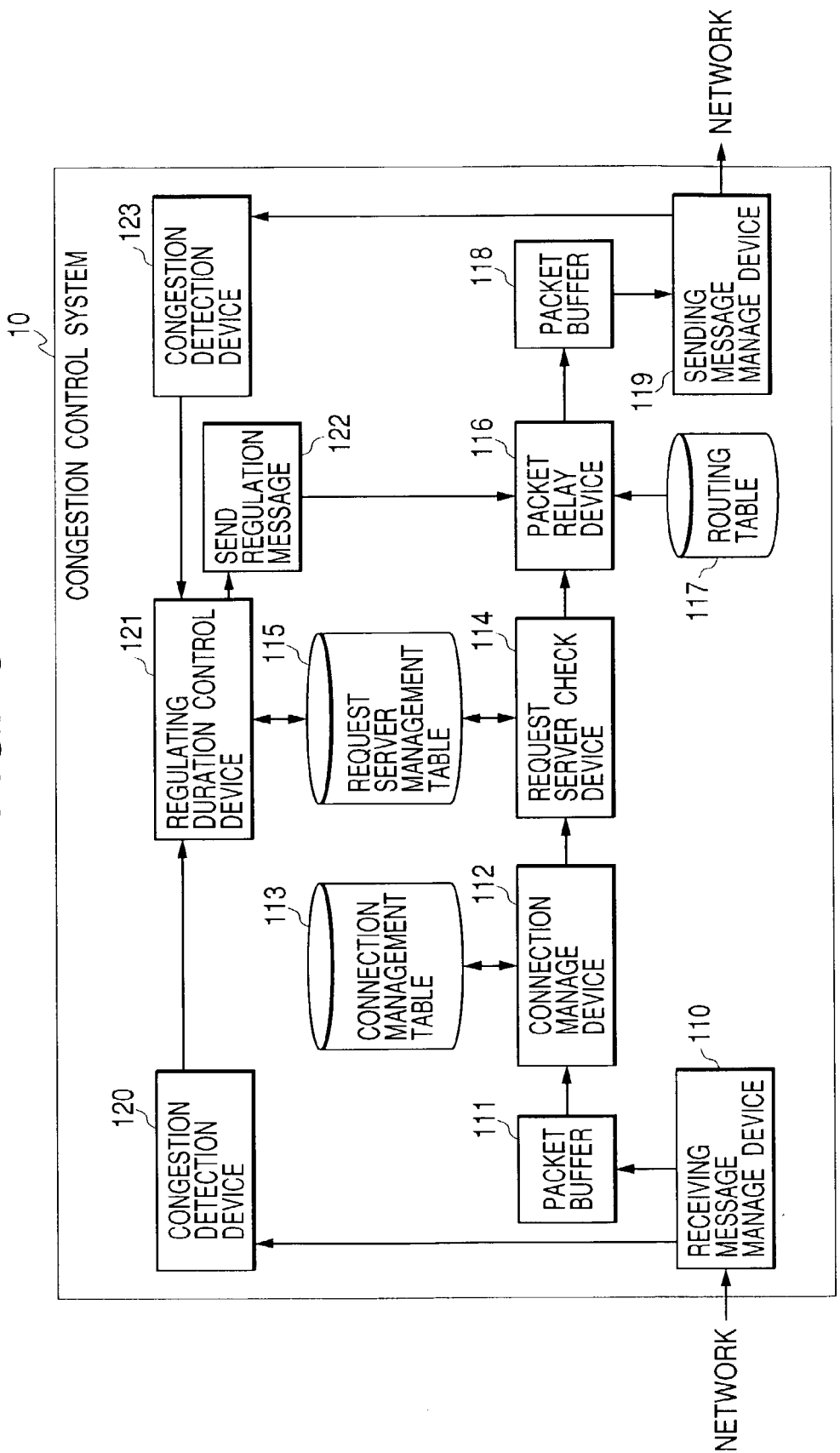
FIG. 5 is a block diagram illustrating the congestion control system constituted by hardware.

FIG. 5 is a block diagram schematically illustrating a second configuration example of the congestion control unit.

The congestion control apparatus 10 includes an input message management unit 110 for receiving messages from the network, a packet buffer 111 in which inputted communication information is recorded, a connection judgment unit 112 for judging communication connection, a connection management table 113 for managing connection in communication, a server-to-be-connected judgment unit 114 for judging a Web server of a destination to be connected, a server management table 115 for managing connection, servers to be connected and the number of connection regulations, a packet transmission unit 116 for constituting a packet including transmission data and transmitting it, a routing table 117 for deciding a destination to which the packet is delivered or transmitted, a packet buffer 118 in which communication information for transmission is recorded, a transmission message management unit 119 for transmitting the packet to the network, a congestion detection unit 120 for detecting congestion of the network at the input side of the congestion control apparatus, a congestion detection unit 123 for detecting congestion of the network at the output side of the congestion control apparatus, a regulation duration calculation unit 121 for calculating the regulation duration, and a connection regulation transmission unit 122 for transmitting connection request regulation information.

(3) Data Structure Used in System

The data structure used in the congestion control apparatus 10 is then described with reference to the drawings.

FIG. 6 shows a management table for server states managed in the server state table 15.

Entries of the server stage table 15 are identified and managed for each Web server by means of identification number 130. Each entry includes an identification number 130 for identifying a Web server of a destination to be connected, a URL to be connected 131 in which a string of letters of URL of a Web server to be connected is stored, the number of connection regulations 132 indicating the number of Web browsers 30 which are in the connection regulation state for the Web server and to which the connection request regulation message has been transmitted as a response to thereby set in the connection regulation state, the number of current requests 133 from Web browsers 30 per unit time, and estimated processing capability or throughput 134 indicating the number of connections processed by the Web server in past time zones. The number of connection regulations 132 is managed by incrementing the estimated processing capability 134 each time the connection request regulation message is transmitted to the Web browser as a response and by decrementing the estimated processing capability 134 each time the connection regulation duration expires. A plurality of estimated processing capabilities 134 are provided in accordance with a memory capacity of the congestion control system so that the accuracy of the estimated processing capability 134 is prevented from being degraded even if the load on the Web server is varied in each time zone.

FIG. 7 shows a management table of the connection request regulations managed in the regulation information table 33.

Each entry of the regulation information table 33 includes a URL requested 160 in which a string of letters of URL of a Web server under regulation is stored or set and a regulation hour 161 for managing a remaining duration that the connection request regulation instructed by the congestion control apparatus 10 is performed.

(4) Details of Communication Operation of System

The details of communication operation of the connection regulation control system are now described with reference to the drawings.

The case where the user is connected to the Web server 51 is described by way of example.

The Web browser 30 receives a connection request to the Web server 51 from the user by means of the user interface 32.

FIG. 8 is a flow chart showing detailed operation of the Web request transmission unit 34 of the Web browser 30.

The Web request transmission unit 34 receives the connection request to the Web server from the user interface 32 in request reception step 220 and judges whether the URL requested is contained in the URL requested 160 of the regulation information table 33 or not in URL-to-be-regulated judgment step 221. When the URL requested is contained, the Web request transmission unit 34 judges whether the regulation hour of the regulation information table 33 expires or not in regulation hour expiration judgment step 222 and when the regulation hour has expired, the Web request transmission unit 34 adds a re-request flag 171 to the connection request message 174 in re-request flag setting step 223. The connection request message 174 is transmitted to the network interface 35 in request transmission step 224. Further, when the regulation hour does not expire in regulation hour expiration judgment step 222, the Web request transmission unit 34 notifies the user interface that the Web server of the URL requested is being regulated in request rejection step 225.

Figure 9:
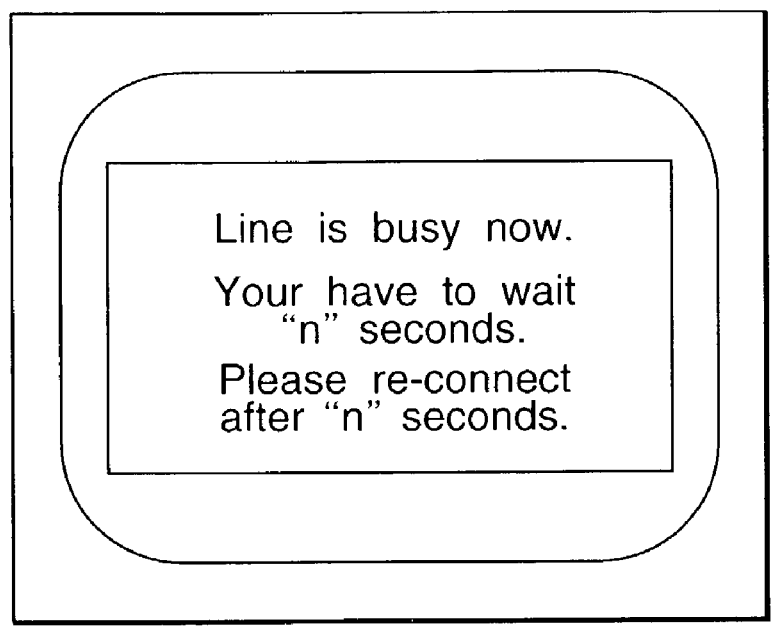
FIG. 9 is a diagram showing a picture of a user interface image in case where the Web server of the URL requested is being regulated.

FIG. 9 shows an example of a picture displayed by the user interface 32 and showing that the Web server of the URL requested is being regulated. In the embodiment, a predetermined value n controlled by the congestion control apparatus is displayed in the Web browser and the user performs re-connection request in accordance with the instructions. As another example, re-connection request may be performed automatically after a predetermined time in accordance with the connection request regulation message by means of the software or hardware of the Web browser.

Figure 10:
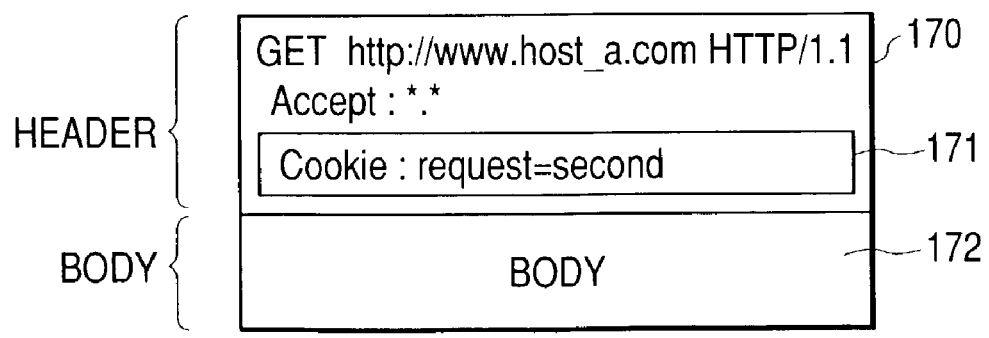
FIG. 10 shows a format of a connection request message.

FIG. 10 shows an example of a connection request transmitted by the Web browser 30. The connection request includes a request http header 170 in which URL or the like of the Web server requested is recorded or set and a request http body 172. When it is judged that the regulation duration is expired in regulation duration expiration judgment step 204, a re-request flag 171 indicating that a re-request is being made after expiration of the regulation duration is contained in the request http header 170 and the header 170 containing the re-request flag 171 is transmitted.

When the congestion control apparatus 10 receives a connection request from the Web server 10 by means of the network interface 11, the congestion control apparatus 10 supplies the connection request to the Web traffic relay unit 12.

The Web traffic relay unit 12 first sends the connection request to the connection regulation response unit 14. When it is not necessary to transmit a connection regulation message as a response in the connection regulation response unit 14, the connection request is transmitted to the Web server 51 through the network interface 13 and a response from the Web server 51 is relayed to the Web browser 30 through the network interface 11.

Figure 11:
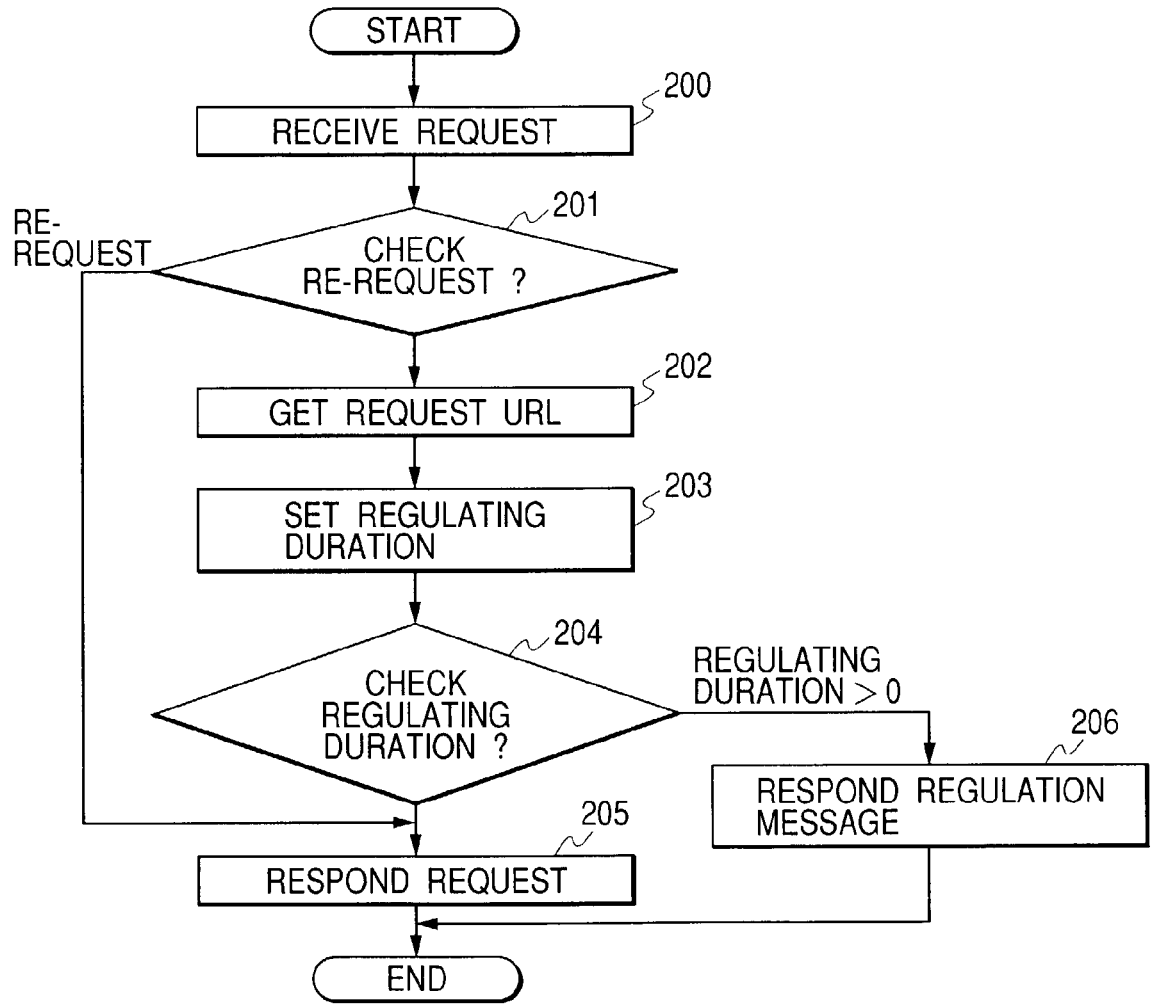
FIG. 11 is a flow chart showing operation of a connection regulation response unit.

FIG. 11 is a flow chart showing detailed operation of the connection regulation response unit 14.

The connection regulation response unit 14 receives the connection request from the Web traffic relay unit 12 in request reception step 200 and judges whether a re-request flag 171 is contained in the connection request in re-request judgment step 201. When it is not contained, the connection regulation response unit 14 identifies the Web server to be connected from URL contained in the connection request in URL-to-be-connected decision step 202. The connection regulation response unit 14 retrieves the URL requested 131 of the server state table 15 and calculates a connection regulation duration on the basis the number of connection regulations and the estimated processing capability 134 of the URL requested corresponding thereto in connection regulation duration calculation step 203. The connection regulation duration is calculated, for example, by dividing the number of connection regulations 132 by the estimated processing capability 134. Further, a rate for making re-request by the user is set in accordance with the elapse of time and the rate may be added to the connection regulation duration. Alternatively, a Web server having the estimated processing capability 134 being unlimited may be set and whether congestion control is made or not may be changed for each Web server or a user authentication apparatus may be provided separately from the congestion control apparatus and user information may be acquired from the user authentication apparatus, so that the connection regulation duration may be changed for each user or whether congestion control is made or not may be changed for each user.

Figure 12:
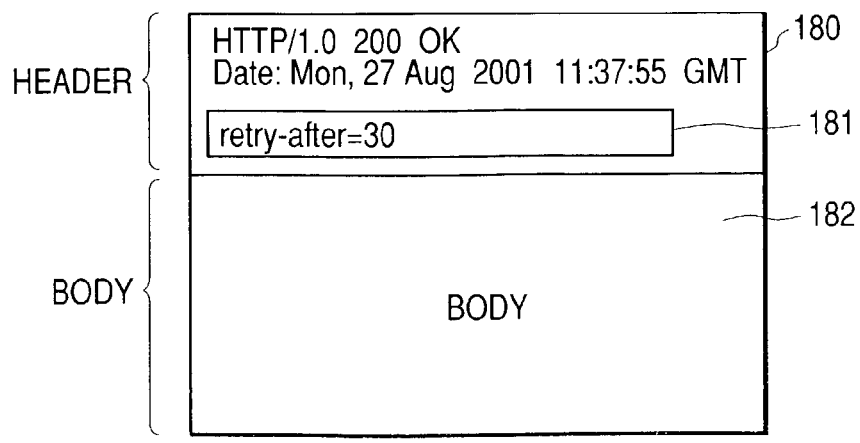
FIG. 12 shows a format of a connection regulation response.

When the connection regulation response unit 14 judges that the regulation duration is larger than 0 in regulation duration judgment step 204, the connection regulation response unit 14 transmits a connection regulation response as shown in FIG. 12 to the Web browser 30. The connection regulation response includes a response http header 180 and a response http body 182 and the response http header 180 contains the connection regulation duration 181.

When the regulation duration is equal to 0 in regulation duration judgment step 204 or when the connection request is a re-request in re-request judgment step 201, the connection regulation response unit 14 instructs the Web traffic relay unit 12 to relay Web traffic in request response step 205.

The congestion detection unit 16 manages response delay of TCP/IP packet, throughput, retransmission request and window size as state parameters of TCP/IP and sets respective thresholds in order to judge delay of connection to thereby monitor the state of connection. The congestion detection unit 16 receives state parameters of TCP/IP from the network interface 13 and compares the state parameters with the respective thresholds to judge whether the state of connection is in the delayed state or not. When the state of connection is delayed, the congestion detection unit 16 totalizes the number of connections in the delayed state for each Web server to be connected and obtains the number of current requests 142 for each Web server to be connected from the server state table 15 to thereby calculate a rate of the number of current requests 142 and the number of connections in the delay state. When the rate exceeds a threshold for judging a previously set congestion state, the Web server is judged to be in the congestion state and the estimated processing capability 143 thereof is reduced. When it is judged that the Web server is not in the congestion state, the estimated processing capability 143 which is an estimated value of the number of processing operations of the Web server for a fixed time is increased. The connection regulation duration transmitted to the Web browser as a response is increased or reduced in accordance with the estimated processing capability 143 and the number of connection regulations 132 which is the number of Web browsers 30 to which the connection request regulation message is transmitted as a response so that the Web browsers are in the connection regulation state.

Embodiment 2

A second embodiment according to the present invention is now described with reference to the drawings.

(1) Outline of System

Figure 13:
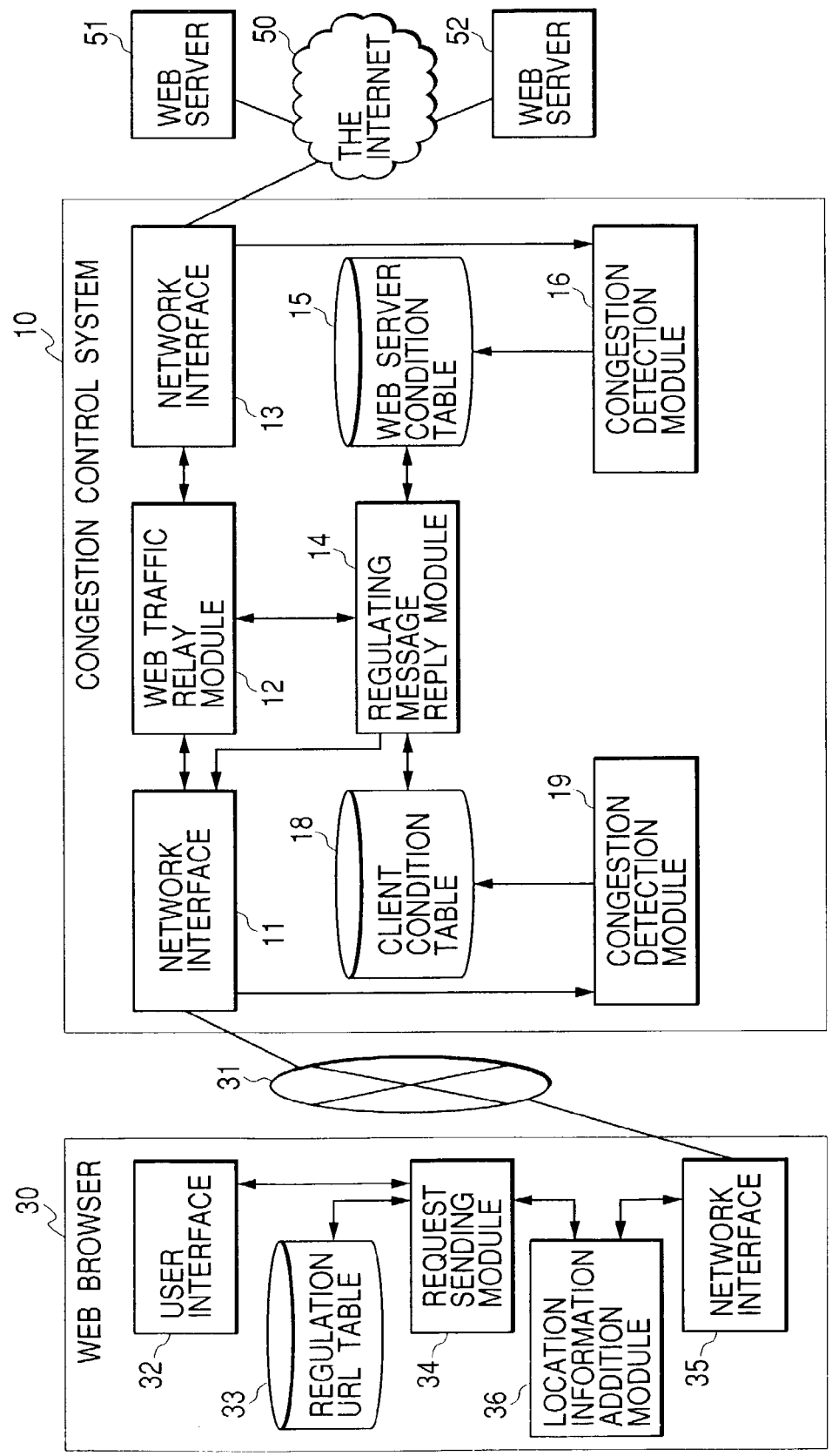
FIG. 13 is a block diagram schematically illustrating a congestion control system.

Referring first to FIG. 13, an outline of a congestion control system according to the second embodiment is described.

FIG. 13 is a schematic diagram illustrating the congestion control system according to the second embodiment.

In the first embodiment, the connection regulation duration is varied in accordance with the congestion state of the Web servers 51 and 52, while in the second embodiment, the connection regulation duration is varied in accordance with the congestion state of the network 31 between the Web browser 30 and the congestion control apparatus 10 in addition to the processing of the first embodiment.

In configuration, a positional information addition unit 36 is added to the Web browser 30. The positional information addition unit 36 adds positional information of the Web browser 30 to the connection request. Other functions and operation of the functions are the same as those of the first embodiment.

A client state table 18 and a congestion detection unit 19 are added to the congestion control apparatus 10. The client state table 18 manages the number of Web browsers in each area on the basis of the positional information notified by the Web browser. The congestion detection unit 19 detects whether communication between the congestion control apparatus 10 and the Web browser is delayed or not. The connection regulation response unit 14 utilizes the connection regulation duration calculated by regulation duration calculation unit 20 in addition to the regulation duration calculation unit 17. Other functions and operation of the functions are the same those of the first embodiment.

(2) Configuration of System

The details of the system are now described with reference to the drawings.

Figure 14:
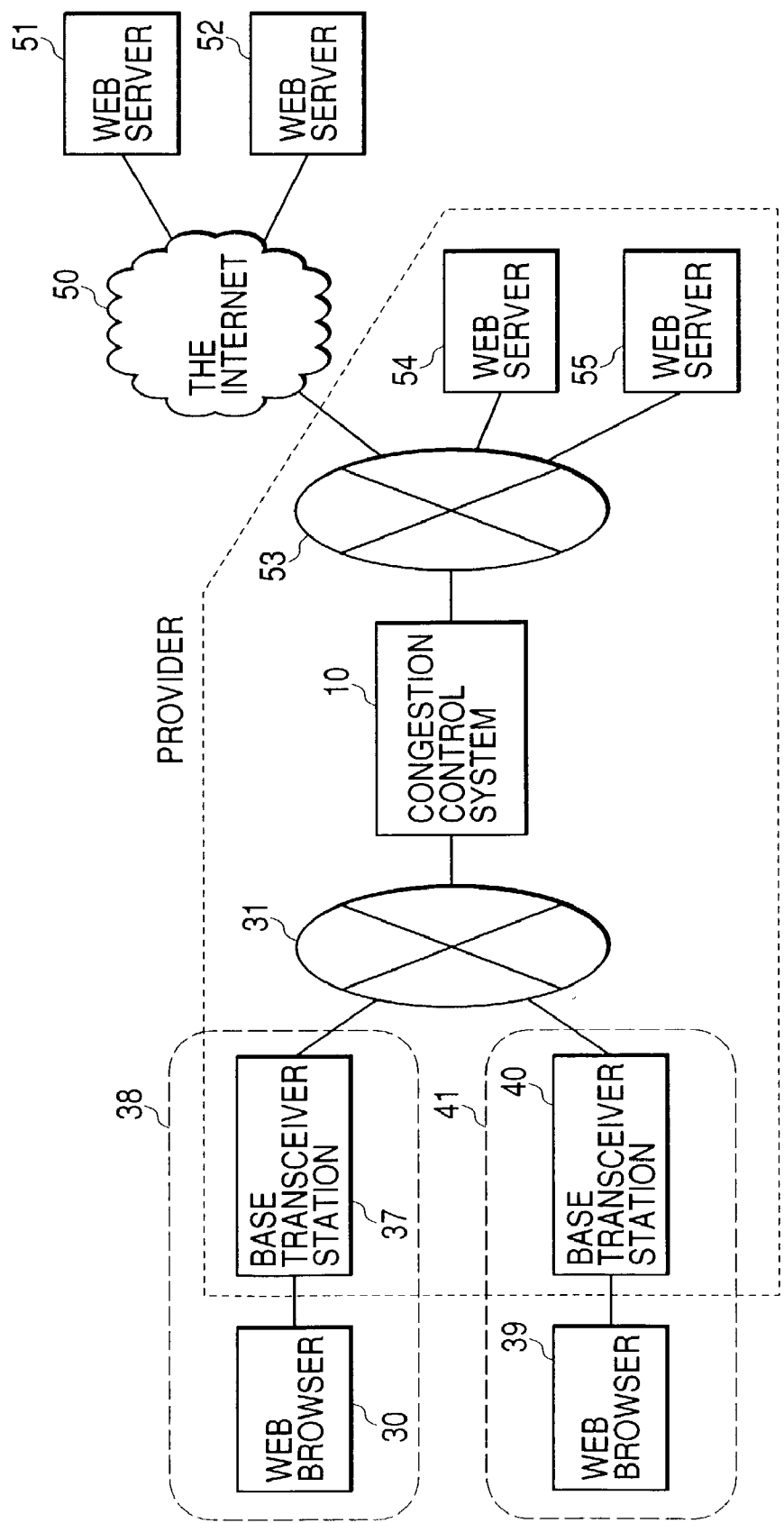
FIG. 14 is a schematic diagram illustrating network.

FIG. 14 is a schematic diagram illustrating network of the second embodiment of the congestion control system.

In the network supposed in the second embodiment, base stations 37 and 40 utilized by the Web browsers 30 and 39, respectively, and areas 38 and 41 where the Web browsers 30 and 39 are positioned, respectively, are added to the network as compared with the first embodiment. In the second embodiment, congestion is detected in each area and the connection regulation duration is adjusted for each area.

According to the second embodiment, the connection regulation duration can be varied for each area and re-request can be made fixed even for concentration of requests to the base station. Further, different priority can be assigned to each area. For example, request from the area under congestion can be processed preferentially.

Figures 15, 16:
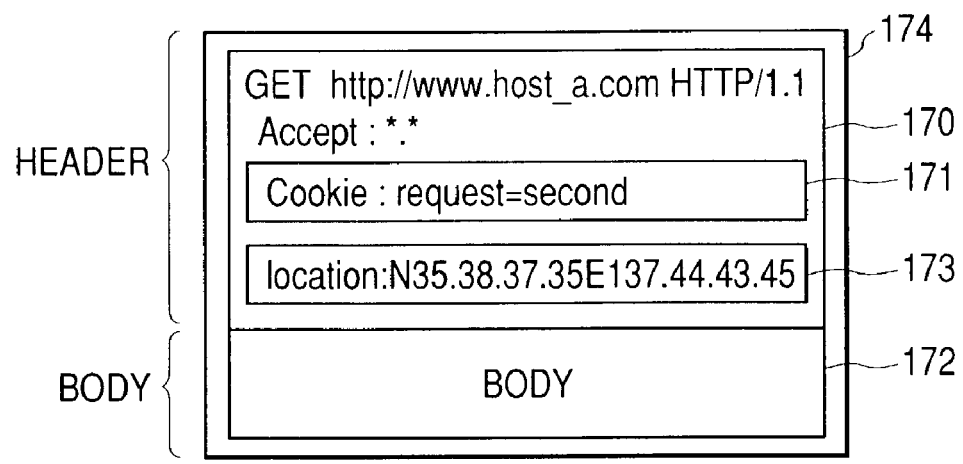
FIG. 15 shows a format of a connection request.
FIG. 16 shows a client state management table.

FIG. 15 shows an example of a connection request utilized in the second embodiment.

The connection request utilized in the second embodiment includes a request http header 170 and a request http body 172. The request http header 170 includes a re-request flag 171 indicating a re-request and a positional information header 173 as extension header. The positional information may be contained in URL in the request http header 170 besides provided as the extension header.

(3) Data Structure Used in System

The data structure used in the connection regulation control system is now described with reference to the drawings.

FIG. 16 shows the client state table 18 for managing the state of clients.

In the client state table 18, clients are classified into respective areas 140, and the number of current requests 142 which is the number of current request in each area, the number of regulations 141 which is the number of connection request regulations transmitted to each area as response, and the estimated processing capability 143 for each area are managed in the client state table 18.

Detailed communication operation of the connection regulation control system is now described with reference to the drawings.

Figure 17:
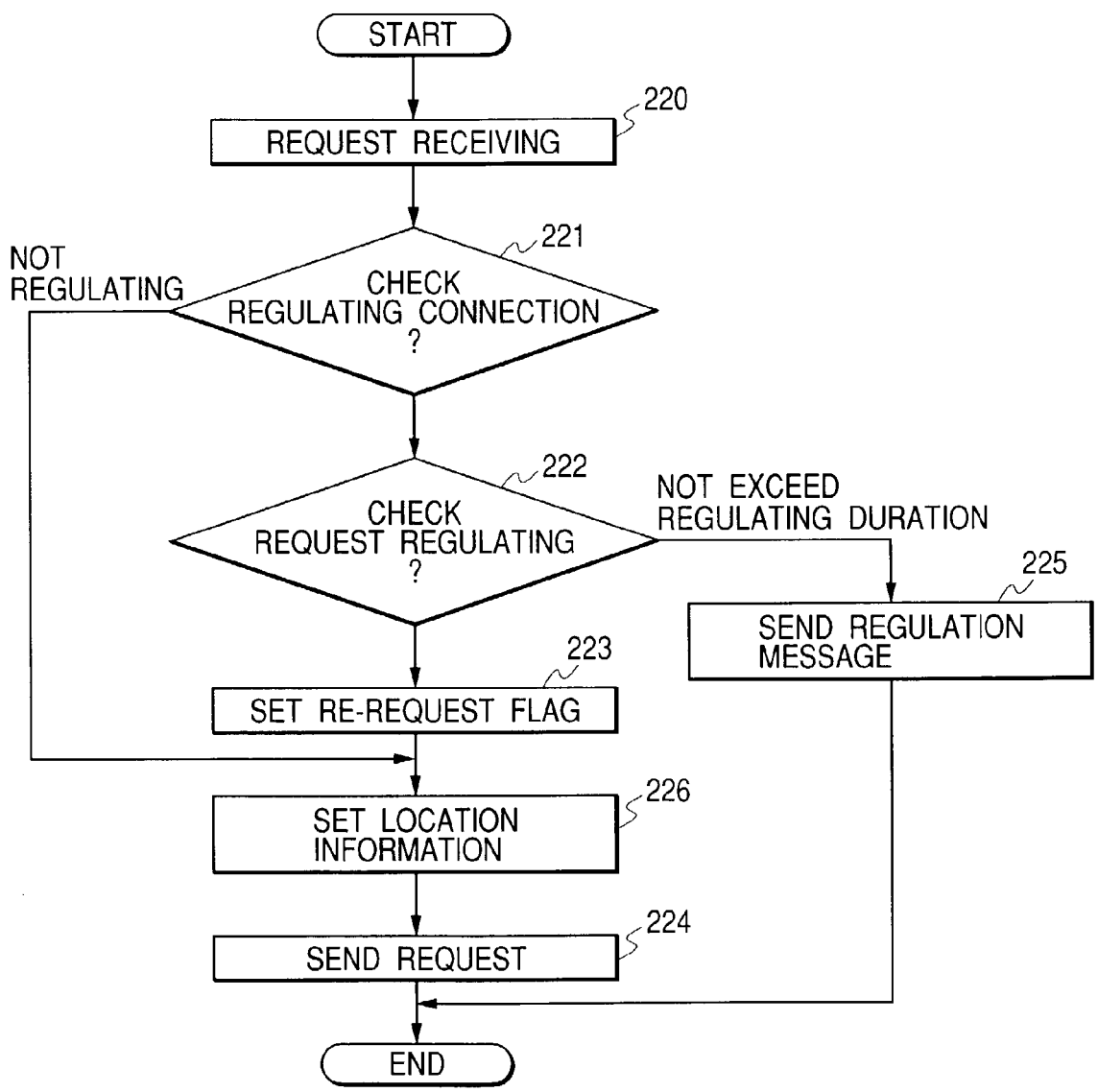
FIG. 17 is a flow chart showing operation of a Web request transmission unit.

FIG. 17 is a flow chart showing detailed operation of the Web request transmission unit 34 in the second embodiment.

Operation of the user interface 32 is the same as the first embodiment.

The Web request transmission unit 34 receives a connection request to the Web server from the user interface 32 in request reception step 220 and judges whether the URL to be requested is contained in the URL requested 160 of the regulation information table 33 or not in URL-to-be-regulated judgment step 221. When it is contained, the Web request transmission unit 34 judges whether the regulation hour of the regulation information table 33 has passed or not in regulation duration expiration judgment step 222. When the regulation hour has passed, a re-request flag 171 is added to the connection request 174 in re-request flag setting step 223 and a positional information header 226 is added to the connection request 174 in positional information setting step 226. Then, the connection request 174 is sent to the network interface 35 in request transmission step 224.

Measures and form for receiving the positional information are not limited particularly, while in the embodiment it is supposed that latitudinal and longitudinal information can be received from the base station 36 utilized by the Web browser 30. Further, in regulation duration expiration judgment step 222, when the regulation duration is not expired, the Web request transmission unit 34 notifies the user interface 32 that the Web server is being regulated in request rejection step 225.

Operation of the network interfaces 35 and 11 and the Web traffic relay unit 12 is the same as the first embodiment.

Figure 18:
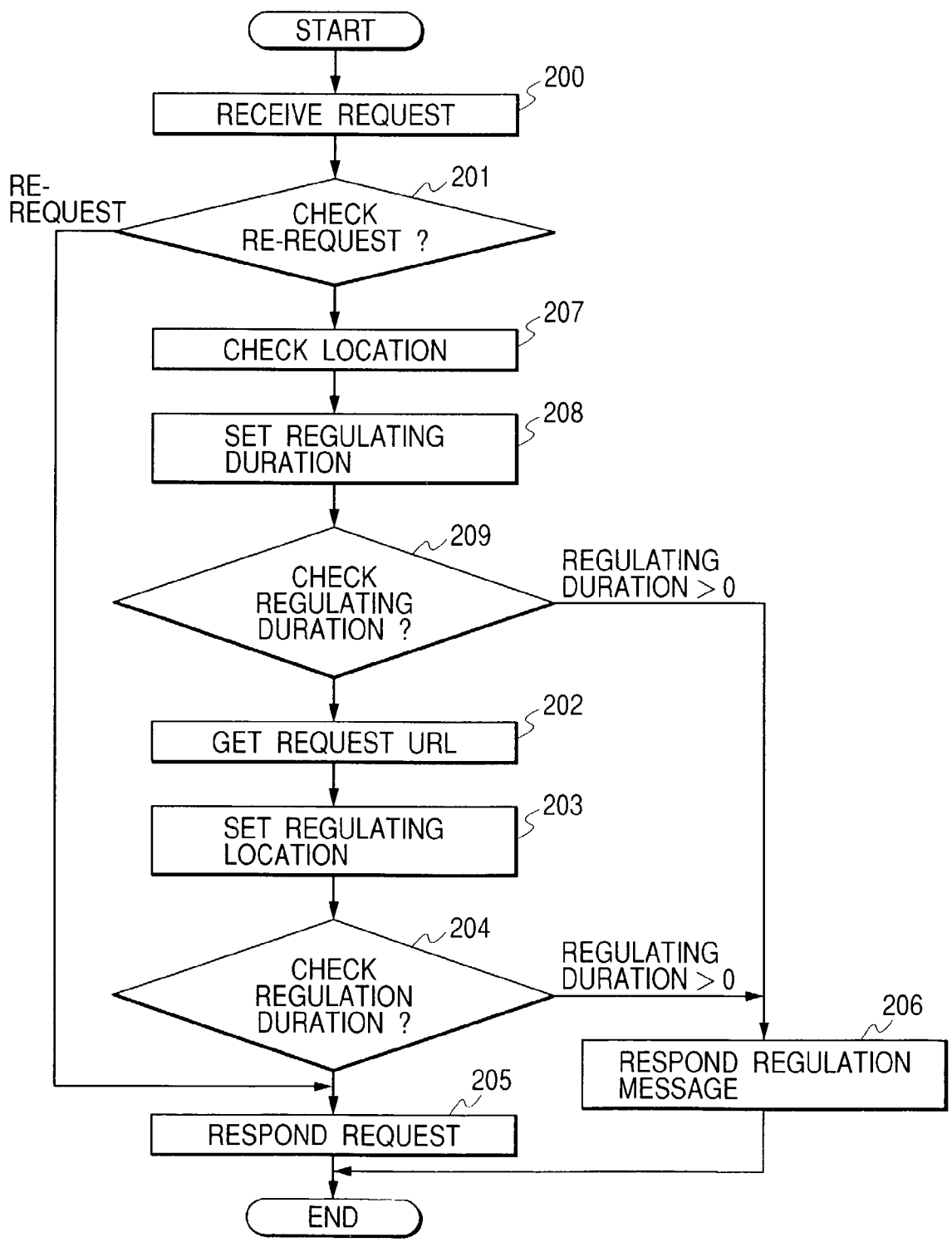
FIG. 18 is a flow chart showing operation of a connection regulation response unit.

FIG. 18 is a flow chart showing detailed operation of the connection regulation response unit 14 of the second embodiment.

The connection regulation response unit 14 receives the connection request from the Web traffic relay unit 12 in request reception step 200 and judges whether a re-request flag 171 is added to the connection request or not in re-request judgment step 201. When it is not added, the connection regulation response unit 14 identifies an area where the Web browser 30 transmits the connection request 174 from the positional information header 173 added to the connection request 174 in area identification step 207. The connection regulation response unit 14 retrieves the area 140 of the client state table 18 and calculates a connection regulation duration on the basis of the number of regulations 141 in the area and the estimated processing capability 143 in connection regulation calculation step 208. The connection regulation duration is calculated, for example, by dividing the number of regulations 141 by the estimated processing capability 143. Further, a rate for making re-request by the user is set in accordance with the elapse of time and the rate may be added to the connection regulation duration.

Operation in subsequent steps including URL-to-be-connected decision step 202, connection regulation duration calculation step 203, regulation duration judgment step 204, request response step 205 and connection regulation response step 206 is the same as the first embodiment.

The congestion detection unit 19 has the same operation as that of the congestion detection unit 16 of the first embodiment with the exception that the network interface connected thereto and a storage location of information are different.

Not only the Web server utilized in the request from the Web browser but also network resources on the client side are judged and the connection regulation duration is returned in accordance with the utilization number for each network resource.

Consequently, since the number of re-requests per unit time can be made fixed, congestion due to re-request can be prevented and the user can necessarily utilize the Web service upon re-request. Further, the service utilizable hour can be grasped to utilize the Web service deliberately.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A congestion control system used in a Web service in which a user utilizes the Web to receive contents and provided between Web clients to be operated by users and Web servers for providing contents service to the Web clients, comprising:
    relay means for relaying contents requests from said Web clients and responses to the contents requests from said Web servers;
    congestion detecting means for detecting that traffic from one of said Web servers is in a previously defined congestion state; and
    request regulation means for transmitting, in response to a new contents request addressed to one of said Web servers for which said congestion detecting means detects the congestion state, a connection request regulation message for regulating retransmission of contents requests to the congestion state Web server from one of said Web clients having transmitted the new content request, said request connection regulation message designating a regulation duration for the congestion state Web server,
    wherein when a contents request including flag information indicating that the request was transmitted after the regulation duration has elapsed is received from the Web client, said relay means forwards the contents request to one of said Web servers unconditionally.

2. The congestion control system according to claim 1, wherein said congestion detecting means includes responsive state detection means for identifying a Web server to be requested contents service based on said received contents request
    for detecting a congestion state in the TCP/IP layer of responses from the Web and server,
    wherein said request regulation means controls the regulation duration for each Web server variably based on the congestion state of the Web server detected by said responsive state detection means, and the number of contents requests to said identified Web server or the number of connection request regulation messages transmitted to said Web clients.

3. The congestion control system according to claim 1, further comprising:
    means for extracting positional information from said contents request;
    means for correlating said Web to one of classified areas based on on said positional information;
    means for detecting a connection in congestion state based on a reception state of said Web client in the TCP/IP layer with regard to response from one of Web servers to the Web client; and
    means for totalizing, for each of said classified areas, the number of connections detected as congestion state, the number of Web clients and the number of connection request regulation messages transmitted to the Web clients in the area;
    wherein the regulation duration is controlled area by area based on said statistic information totalized for each classified areas.

4. The congestion control system according to claim 1, wherein said connection request regulation message is transmitted with a variable regulation duration different for each Web client as a response to said contents request.

5. The congestion control system according to claim 2, further comprising:
    means for collecting statistics data for each area, the statistic data including the number of contents requests, processing capability assumed from TCP/IP layer reception state of the Web clients in the area, and the number of connection request regulation messages transmitted to the Web clients in the area; and
    means for calculating local regulation duration when a new contents request was received from one of said Web clients, based on the statistics data of specific area which is specified by positional information included in the received contents request,
    wherein said request regulation means issues said connection request regulation message, designating either of said local regulation duration for each area and said regulation duration for the congestion state Web server.

6. The congestion control system according to claim 1, further comprising:
    second congestion detecting means for detecting, for each of said Web servers, that traffic toward the Web server from said Web clients is in a previously defined congestion state,
    wherein said request regulation means controls said regulation duration for said congestion state Web server, taking account of the congestion state detected by said second congestion detecting means.

7. A method of regulating contents requests toward a Web server from Web clients when the Web server is in a congestion state, comprising the steps of:
- detecting that traffic of responses from the Web server is in a previously defined congestion state;
- transmitting in response to a new contents request addressed to the Web server in the congestion state, a connection request regulation message for regulating retransmission of contents request to the congestion state Web server from one of said Web clients having transmitted the new content request, said connection request regulation message designating a regulation duration for the congestion state Web server, and
- relaying a contents request received from one of said Web clients to said Web server unconditionally when the contents request includes flag information indicating that the request was retransmitted after the regulation duration has elapsed.

8. The method according to claim 7, wherein said regulation duration is variable depending on a congestion state of the Web server.

9. The method according to claim 6, wherein said regulation duration is determined depending on information concerning processing capability of the Web server and information concerning the number of current contents requests for the Web server.

10. The method according to claim 6, wherein said regulation duration is depending on information concerning the Web client.

11. The method according to claim 7, wherein said regulation duration is depending on a congestion state in network between the Web server and one of said Web clients having transmitted said new contents request.

12. A congestion control system used in the Web service in which a user utilizes the Web to receive contents and provided between user's Web clients and Web servers for providing contents, comprising:
- means for relaying a contents receiving request from the Web client and a response of contents to said contents receiving request;
- means for transmitting as a response a connection request regulation message for regulating the Web client from transmitting the contents receiving request to the Web server for a predetermined connection regulation duration to the Web client instead of the contents when the relay state at the time of the relaying is detected to be in a previously set congestion state;
- identification means for identifying a Web server storing contents corresponding to said contents receiving request on the basis of said contents receiving request;
- responsive state detection means for detecting a responsive state in the TCP/IP layer from said identified Web server; and
- totalization means for totalizing said detected responsive state, the number of contents receiving requests from other users to said identified Web server and the number of connection request regulation messages transmitted to the Web client as a response with regard to said identified Web server,
- wherein the connection regulation duration is controlled on the basis of said totalization and the connection request regulation message is transmitted to said Web client as a response.

13. A congestion control system used in the Web service in which a user utilizes the Web to receive contents and provided between user's Web clients and Web servers for providing contents, comprising:
- means for relaying a contents receiving request from the Web client and a response of contents to said contents receiving request;
- means for transmitting as a response a connection request regulation message for regulating the Web client from transmitting the contents receiving request to the Web server for a predetermined connection regulation duration to the Web client instead of the contents when the relay state at the time of the relaying is detected to be in a previously set congestion state;
- positional information obtainment means for obtaining positional information added by the Web client from said contents receiving request;
- division means for dividing Web clients into each area on the basis of said obtained positional information;
- reception state detection means for detecting a reception state in the TCP/IP layer of said Web client with regard to transmission of contents to said divided Web client; and
- totalization means for totalizing the detected reception state, the number of Web clients in a specific divided area and the number of connection request regulation messages transmitted to said specific divided area as responses,
- wherein the connection regulation duration is controlled on the basis of said totalization and the connection request regulation message is transmitted to said Web client as a response.

* * * * *